June 15, 1926.                                              1,589,250
J. H. SHAW
LOCK FOR GEAR SHIFT LEVERS
Original Filed Dec. 22, 1919
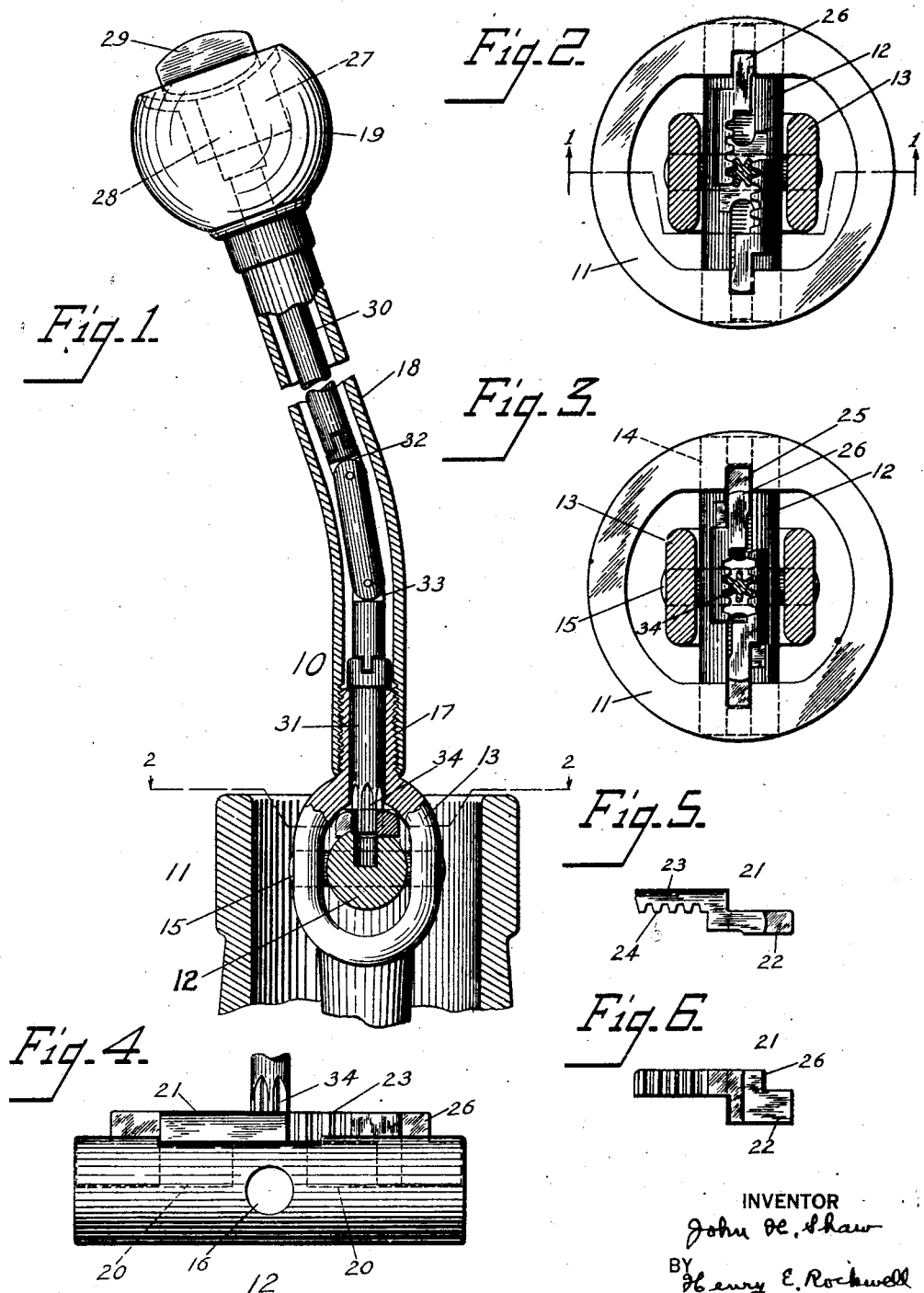
INVENTOR
John H. Shaw
BY
Henry E. Rockwell
ATTORNEY Patented June 15, 1926.

1,589,250

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

LOCK FOR GEAR-SHIFT LEVERS.

Application filed December 22, 1919, Serial No. 346,482. Renewed October 1, 1920. Serial No. 414,143.

This invention relates to locks and more particularly to means for locking a gear shift lever or the like against unauthorized manipulation.

The primary object of my invention is to provide a swinging lever of the type which is provided with a pivot pin for swingingly supporting the same upon its bracket, with key controlled means cooperating with said pivot pin for locking the lever against manipulation.

A more specific object of my invention is to provide a gear shift lever of the type above referred to, with key controlled means carried by the pivot pin and movable into and out of locking engagement with the lever supporting bracket.

To these and other ends the invention consists in the novel features and combinations of parts to be hereinafter described and claimed.

In the accompanying drawing:

Fig. 1 is a vertical sectional view through a gear shift lever and a portion of its supporting bracket, the section being taken substantially on the line 1—1 of Fig. 2 looking in the direction of the arrows.

Fig. 2 is a horizontal sectional view taken substantially on the line 2—2 of Fig. 1 looking in the direction of the arrows and showing the parts in their locked position.

Fig. 3 is a view similiar to Fig. 2 but showing the parts in their unlocked position.

Fig. 4 is an enlarged side view of the pivot pin and sliding bolts mounted therein.

Fig. 5 is a plan view of one of the sliding bolts; and

Fig. 6 is a side view of the bolt shown in Fig. 5.

In the drawing I have used the numeral 10 to designate a lever which is swingingly mounted for universal movement within the supporting bracket 11. In the embodiment of my invention illustrated, the means for pivotally mounting the lever 10 within its supporting bracket 11 consists of a pivot pin 12, which extends through the relatively large opening formed in the ringlike portion 13 of the gear shift lever 10, the opposite ends of this pivot pin being rotatably mounted in bearings formed in the bracket 11, as indicated by 14. The pivot pin 12, which passes through the ringlike portion 13 of the gear shift lever is pivotally secured to this portion by the pin 15, which extends through the drill-hole 16 formed in the pivot pin 12, and has its opposite ends mounted in the opposite sides of the ringlike portion 13. The gear shift lever 10 is preferably provided with a short threaded post 17 extending upwardly from the ringlike portion 13, and upon this threaded post is mounted a tubular member 18 forming the upper portion of the gear shift lever, and upon the upper end of the tubular portion 18 is provided the usual knob 19. From the above description, it will be seen that the gear shift lever 10 is free to rock in one plane upon its supporting pin 15 and that it is free to rock in a second plane at right angles to the first upon the pivot pin 12 so that these pivot pins extending at right angles to each other provide a universal mounting for the gear shift lever.

The key controlled locking means which I have disclosed for locking the gear shift lever will now be described. Within the upper face of the pivot pin 12 I have formed the longitudinally extending slots 20 extending inward from each end of this pin and in these slots are slidably mounted the locking bolts 21. These locking bolts are preferably provided with a portion 22 adapted to be slidably received in the slot 20 and with an offset portion 23 having rack teeth 24 formed therein. Within the bracket 11 directly above the bearings 14 are formed the slots 25 adapted to receive a portion 26 of the sliding bolts when they are moved to their extended position, as shown in Fig. 2. In order to provide key controlled means for retracting and projecting the sliding bolts 21, I have provided a cylinder lock 27 mounted within the knob 19, and in this cylinder lock is mounted a key barrel 28 preferably having a projection 29 formed on the outer end thereof adapted to be grasped between the fingers to rotate the same. To the lower end of the key barrel 28 is rigidly secured a pin 30 which is operatively connected to a second pin 31 by the universal joints 32 and 33. The lower end of the pin 31 is cut to form a pinion 34, as clearly shown in Figs. 2 and 3, and the teeth of this pinion are constructed to cooperate with the rack teeth 24, so that when the pin 31 is rotated in one direction by the key barrel 28, the sliding bolts 21 will be moved outward into locking engagement with the slots 25, as shown in Fig. 2, and when the key barrel is rotated in the opposite direction, these sliding bolts will be retracted to their inoperative position, as shown in Fig. 3.

From the above description, when read in connection with the drawing, it will be seen that when the sliding bolts 21 are moved to their extended position, as shown in Fig. 2, the pivot pin 12 will be prevented from rocking within its bearing 14, and since this pin is non-rotatably mounted within the ring 13 by the second pivot pin 15, so long as the bolts 21 are extended the gear shift lever 10 will be prevented from rocking in one plane. In most of the gear shift levers now in use, it is necessary to first rock the gear shift lever in a lateral direction to move the lower end of the same out of its neutral position and then swing the gear shift lever in a longitudinal direction to operate the gears controlled by the lower end of the same. The locking means which I have just described, by limiting the swinging movement of the gear shift lever to a single plane will prevent the necessary movement being imparted to this lever to shift the transmission gears out of their neutral position.

It will be apparent that various changes may be made in the mechanism herein disclosed for preventing the rotation of the pivot pin 12 without departing from the scope of my invention as defined in the annexed claims.

What I claim is:

1. In combination, a supporting bracket, a lever, means for swingingly mounting said lever upon said bracket, including a lever supporting pivot pin non-rotatably fixed to said lever and rotatably mounted in said bracket, and key controlled means for locking said pivot pin to said bracket against rotation to prevent the operation of said lever.

2. In combination, a supporting bracket, a lever, means for swingingly mounting said lever upon said bracket, including a lever supporting pivot pin non-rotatably fixed to said lever and rotatably mounted in said bracket, and means for locking said pivot pin against rotation to thereby prevent the operation of said lever, comprising a key controlled bolt carried by said pivot pin and movable into and out of locking engagement with said bracket.

3. In combination, a supporting bracket, a lever, means for swingingly mounting said lever upon said bracket including a lever supporting pivot pin, and key controlled means carried by said pivot pin and movable into position to prevent movement of said lever.

4. In combination, a supporting bracket, a gear shift lever, means for swingingly mounting said lever upon said bracket, including a pivot pin non-rotatably fixed to said lever and rotatably mounted in said bracket, and means for locking said pin against rotation to thereby prevent the operation of said lever, comprising a key controlled bolt slidably mounted upon said pin and movable into and out of locking engagement with said bracket.

5. In combination, a supporting bracket, a pivoted lever provided with trunnions rotatably mounted within said bracket, locking means for said lever comprising, key controlled bolts mounted within said trunnions and movable into and out of locking engagement with said bracket.

6. In combination, a supporting bracket, a pivoted lever provided with trunnions rotatably mounted within said bracket, locking means for said lever, comprising bolts slidably mounted within said trunnions and key controlled means for operating said bolts, including a rotatable pinion and teeth formed upon said bolts operatively engaged by the teeth of said pinion.

7. In combination, a supporting bracket, a lever, means for swingingly mounting said lever upon said bracket, including pivot pins extending at right angles to each other, and key controlled means for locking said lever against movement upon one of said pivot pins, including a bolt carried by one of said pins and movable into locking engagement with the bearing member for said pin.

8. In combination, a fixed supporting bracket, a lever, means for swingingly mounting said lever upon said bracket including a pivot pin upon which the lever is supported and key controlled means movable into position to prevent movement of said lever about the axis of said pivot pin, including a reciprocable bolt mounted on the pivot pin and means for shifting said bolt.

9. In combination, a supporting bracket, a lever, means for swingingly mounting said lever upon said bracket including a pivot pin, and key controlled, oppositely moving means on said pivot pin to lock said lever against movement.

10. In combination, a supporting bracket, a lever, means for swingingly mounting said lever upon said bracket including a lever supporting pivot pin movable with said lever and means for locking said pivot pin against movement, including a reciprocable bolt carried by the pivot pin and means for shifting said bolt in opposite directions.

11. In combination, a supporting bracket, a lever, means for swingingly mounting said lever upon said bracket including a pivot pin upon which the lever is supported movable with said lever and inter-engaging key controlled locking means between said bracket and pivot pin.

12. In combination, a supporting bracket, a pivoted lever provided with trunnions rotatably mounted in said bracket and key controlled locking means for said lever comprising key controlled bolts movable into locking engagement between said trunnions and bracket.

13. In combination with a supporting bracket, a pivot pin rotatably carried by the bracket, a gear shift lever mounted on said pin, and means for locking the pin against movement in the bracket comprising a locking rack bar carried by said pin, and a pinion carried by said lever, and engaging the teeth on the rack bar to move the latter to locking position.

14. In combination with a supporting bracket, a pivot pin swingingly mounting a shift lever thereon, and means on the pivot pin and movable in opposite directions for locking the lever against movement within the bracket.

In witness whereof, I have hereunto set my hand on the 18 day of December, 1919.

JOHN H. SHAW.